H. E. A. SCHNEIDER.
Rotary Puddling-Furnace.
No. 215,401.  Patented May 13, 1879.
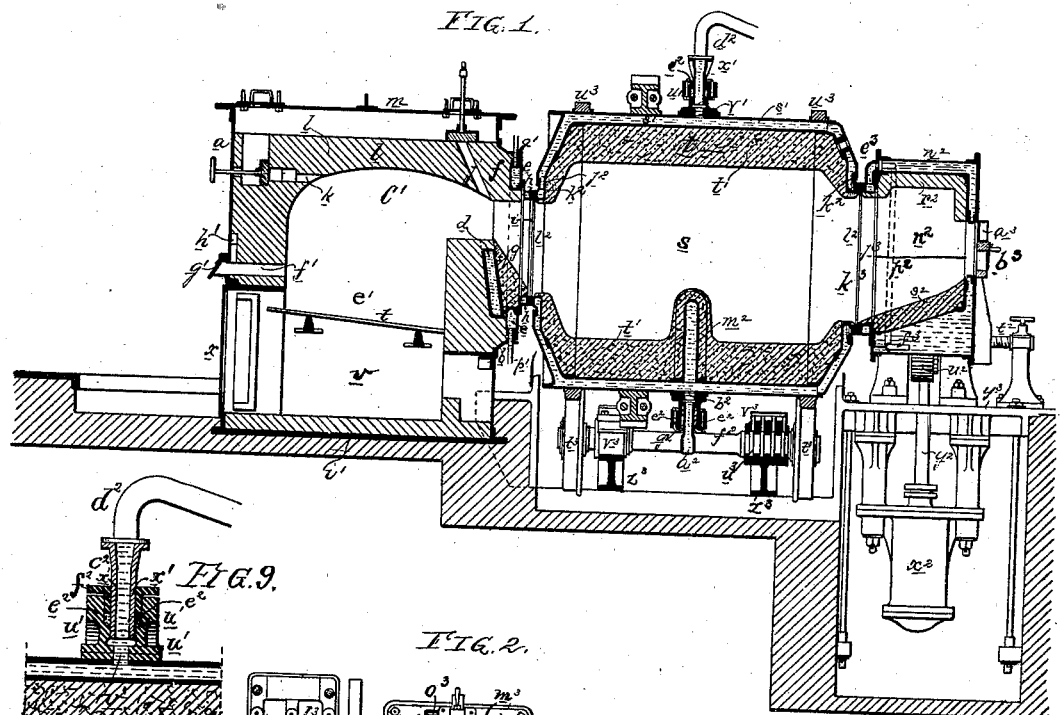
Fig. 1.
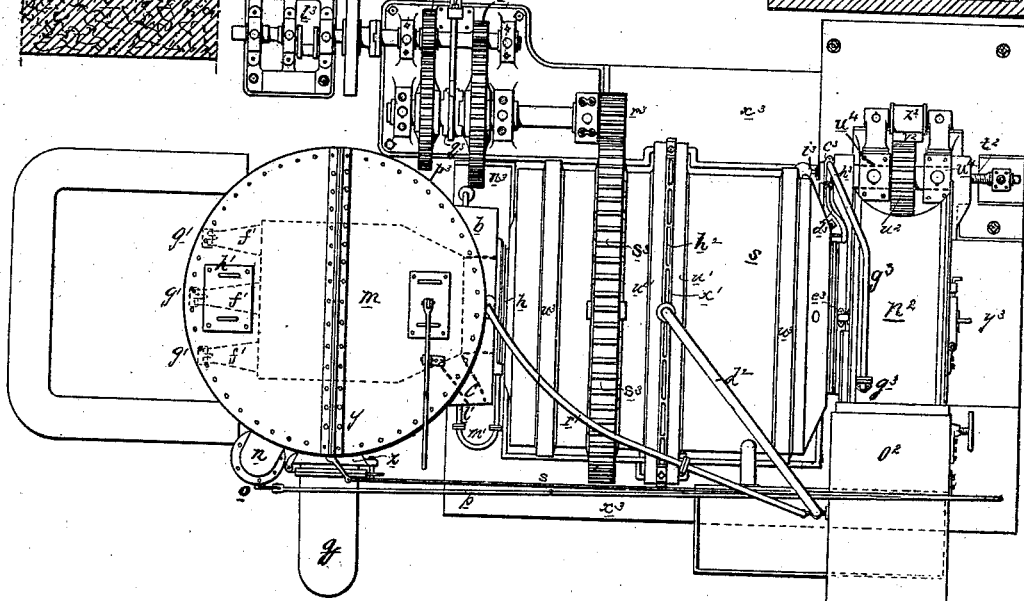
Fig. 9.
Fig. 2.
Witnesses
Henry Howson Jr
Harry Smith
Inventor
Henry E. A. Schneider
by his Attorneys
Howson and Son

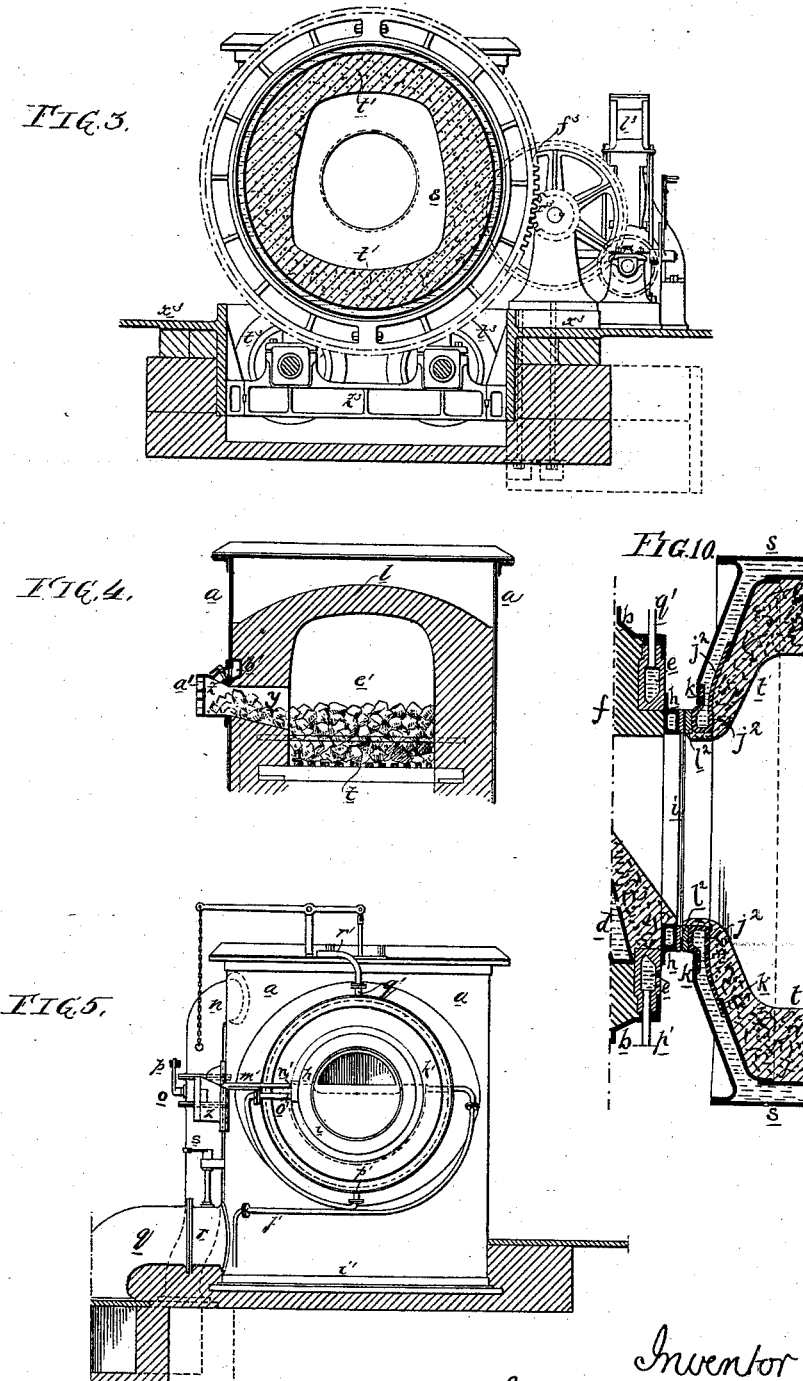

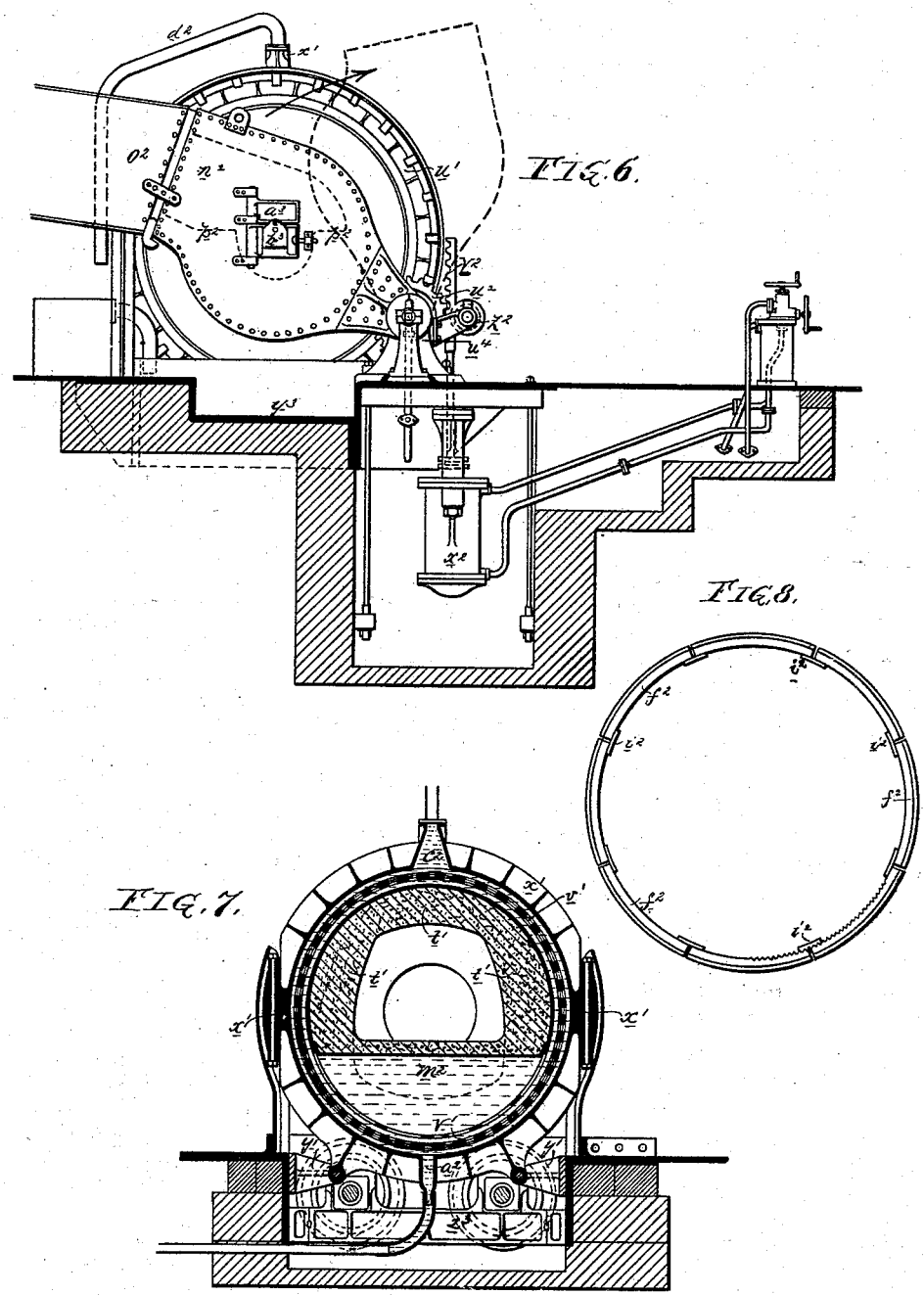

UNITED STATES PATENT OFFICE.

HENRI E. A. SCHNEIDER, OF PARIS, FRANCE.

IMPROVEMENT IN ROTARY PUDDLING-FURNACES.

Specification forming part of Letters Patent No. 215,401, dated May 13, 1879; application filed October 17, 1878; patented in England, May 20, 1878.

*To all whom it may concern:*

Be it known that I, HENRI EUGÈNE ADOLPHE SCHNEIDER, of Paris, France, have invented certain Improvements in Rotary Puddling-Furnaces, of which the following is a specification.

My invention, for which an English patent, No. 2,014 of 1878, was granted to me, relates to certain improvements in rotary puddling-furnaces; and these improvements consist, first, in arranging air-conduits at the front and back of the combustion-chamber; second, in connecting the fuel-openings and stir-openings of the fire-place with the air-blast, so as to prevent the escape of smoke into the workshop; third, in providing the outlet from the combustion-chamber with an annular water-chamber and detachable friction-ring; fourth, in connecting the ends of the cylinders which form the double jacket of the puddling-drum by bent pieces, so that the joints may not be exposed to the heat, and providing these end pieces with detachable friction-rings; fifth, in providing the puddling-chamber with a double water-jacket; sixth, in supplying the water to the drum-casing by means of a grooved ring and a stationary collar, provided with tubular projections, for the inlet and outlet of the water, and so constructing the parts that there shall be a tight joint around the said ring; seventh, in mounting the smoke-box in a horizontal pivot, and providing devices by which the said box may be tilted or swung up away from the puddling-chamber.

In the accompanying drawings, Figure 1, Sheet 1, is a longitudinal section of the complete puddling-furnace; Fig. 2, a plan view of the same; Fig. 3, Sheet 2, a transverse section through the rotary puddling-chamber between its central water-chamber and toothed wheel, by which it is turned; Fig. 4, a transverse section of a portion of the fire-place; Fig. 5, an elevation of the end of the fire-chamber adjoining the puddling-chamber; Fig. 6, Sheet 3, an end view of the pivoted smoke-box and operating devices; Fig. 7, a transverse section through the center of the rotating puddling-drum and the stationary collar, and Fig. 8 a detached view of a portion of the apparatus.

The puddling-furnace is composed of four main parts—namely: first, the fire-place; second, the rotating puddling-drum; third, the smoke-box communicating with the chimney; and, fourth, the mechanism for operating the rotating chamber; and that the invention may be more clearly understood, I will describe the four parts of the furnace in the order named.

The fire-chamber is a brick structure, surrounded by a casing, $a$, of metal, which is secured by angle-iron to a foundation-plate, $i^1$, said casing being in the form of a vertical cylinder, so that it may be less liable to be injured by accidental blows which it may receive.

On the side of this structure, adjacent to the puddling-chamber, is a cylindrical tubular projection, $b$, which forms the outlet for the products of combustion from the fire-place to said puddling-chamber.

At the lower part of this projection is the fire-bridge, composed of a water-chamber, $d$, lined on the side adjacent to the puddling-chamber with oxide of iron $g$, and on the side adjoining the fire-grate $t$ with a layer of bricks.

Access can be had to this bridge for purposes of repair through a lateral opening, $c$, (shown by dotted lines in Fig. 2,) and this without requiring the stoppage of the work of the furnace.

Around the tubular projection $b$ is arranged an annular water-chamber, $e$, through which cold water is caused to circulate, to protect the extremity of the brick arch $f$ of the fire-chamber; and to this water-chamber $e$ is secured a hollow ring, $h$, preferably of bronze, also for the circulation of cold water, as shown in the enlarged sectional view, Fig. 10.

To the end of this chamber is attached a friction-ring, $i$, adapted to bear against a similar ring on the end of the rotating chamber. These rings are so secured by screw or otherwise as to be readily removed and replaced when they become worn.

The arch $f$ inclines downward to the outlet-opening, and through the top of the arch passes an inclined opening or conduit, $j$, which leads from an air-chamber formed between the roof $l$ of the fire-place and the metal cover $m$, secured to or forming part of the cylindrical casing $a$, the air being supplied under pressure from any convenient source through a pipe, $n$, provided with a valve, $o$, Figs. 2 and 5. Another air passage or conduit, $k$, from the chamber above the roof of the fire-place is arranged at the upper part of the front wall of the furnace. These air-passages are provided with dampers, so that the supply of air to the flame can be properly regulated. A blast of air is also admitted below the fire-grate $t$ into the closed ash-pit through the pipe $q$, provided with a valve, $r$, Figs. 2 and 5.

The ash-pit $v$ is furnished with doors $x$, which may be opened for the removal of ashes, &c.

The opening $y$, through which the fuel is supplied to the grate, is represented more clearly in Fig. 4.

In furnaces of this character, where a blast is used, the internal pressure in the combustion-chamber is greater than the external pressure, and smoke and flame consequently escape out through the fuel-opening. To overcome this objection, it is usual to fill the hopper full of coal, the metal door being dispensed with; but the smoke and gases, nevertheless, escape more or less into the shop.

As will be seen on reference to Fig. 4, I bank up the hopper $z$ with fuel, as usual; but I also adapt a door, $a^1$, to the hopper, and put the upper part of the hopper in communication, through a valved passage or conduit, $b^1$, with the air-chamber of the ash-pit. The pressure of air in the hopper being thus greater than the pressure in the combustion-chamber, no smoke or gas, but merely part of the air-blast, escapes through the joints of the door.

As seen in Fig. 1 and indicated by dotted lines in Fig. 2, the openings $f^1$, through which the fire may be stirred, are arranged in the same way—that is to say, these openings, closed by the hinged doors $g^1$, are in communication, through the passage or conduit $h^1$, with the air-blast, so that it is the air, and not the gases, which escapes around the valves.

The cold water is supplied to the rings $h$ and $e$ and water-chamber $d$ in the bridge-wall through the series of pipes represented in Fig. 5. The water, in a cold state, is supplied from any convenient source through the pipe $j^1$, and, entering the water-back $d$ at $k^1$, passes thence, at $l^1$, through the pipe $m^1$, Fig. 2, and enters the ring $h$ at $n^1$, and escapes from the ring at $o^1$. It then passes through a pipe entering the ring $e$ at $p^1$, passes out at $q^1$, and finally discharges through the pipe $r^1$, Figs. 2 and 5.

The rotary puddling-drum $s$ is composed of a double metallic jacket, lined with oxide of iron, $t^1$, of a thickness sufficient to withstand the high temperature to which the metal is to be subjected; for it is on this bed that the conversion of the cast-iron into wrought-iron takes place.

Cold water is caused to circulate through the double metallic jacket, as more fully described hereinafter, so as to keep the outside of the drum cool and prevent its warping.

The inner and outer cylinders of the double jacket are connected at each end by means of an annular piece, $j^2$, preferably of bronze, the ends of which are bent over, so as to coincide with and be secured to the ends of the said cylindrical jacket at some little distance from the inner edges of the openings, so that the joints $k^2$ will be protected from the action of the flames, as shown in Fig. 1 and enlarged detached sectional view, Fig. 10. To the outer edges of each of these bronze pieces $j^2$ is secured a steel friction-ring, $l^2$, which can be removed and replaced when it becomes worn. One of the rings bears against a similar ring, $i$, on the fire-place, while the other bears against another ring, $k^3$, on the smoke-box.

I prefer to make the opening at the end of the puddling-drum adjacent to the fire-place smaller in diameter than the opening at the opposite end, so that the joint between the end of said rotating drum and the fire-place may be at a greater distance from the level of the molten metal in the drum, where there is the greatest heat, than at the opposite end of the chamber, where there is less heat.

A transverse hollow partition, $m^2$, Fig. 1, is constructed across a portion of the puddling-chamber, for the purpose of separating the charge into two parts at each revolution of the drum. I prefer to make this partition of a sheet of copper or soft steel bent so as to form a hollow chamber, surrounded by oxide of iron, like the other portions of the interior of the drum, the interior of this hollow chamber being in communication with the water-space of the double jacket, as shown in Figs. 1 and 7.

If desired, the hollow partition may be formed of a series of superposed pipes, or of a single flat tube, instead of the bent sheet of metal; but in all cases the interior of the hollow partition communicates with the water-jacket.

If desired, two, or even more, such hollow partitions may be employed for dividing the charge.

To the periphery of the drum are secured two strong annular rings, $u^3$, which rest on four flanged wheels, $t^3$, Figs. 1 and 3, thus forming the ways on which the drum is rotated. To prevent any lateral motion, the journals $v^3$ of these wheels have a series of collars adapted to corresponding grooves in the bearings, which are supported by the transverse beams $z^3$, Fig. 3.

To the periphery of the drum is also secured a toothed wheel, $s^3$, through which the desired rotary motion is imparted to the drum from the driving-gear, as explained hereinafter.

The devices by which a circulation of cold water is maintained through the jacket are as follows: To the periphery of the drum is attached an annular ring, $u^1$, in which is formed a deep groove, as shown in the enlarged detached view, Fig. 9, around its entire circumference, the bottom of the groove communicating with the water-space of the jacket through a series of openings, $v^1$, as shown in Fig. 7. To this circumferential groove in the ring is adapted a stationary collar, $x^1$, fixed to the foundation by plates $y^1$, as shown in Fig. 7, so that during the rotation of the drum the recessed ring $u^1$ slides around the collar $x^1$, a water-tight joint being formed between the two by means of a stuffing-box of the peculiar construction described hereinafter. On the lower end of the collar $x^1$ is a tubular projection, $a^2$, through which the water enters under pressure, and then passes through the openings in the bottom of the recessed ring $u^1$, and enters the double jacket at $b^2$, Fig. 1. This water, after circulating through the jacket, passes out through the tubular projection $c^2$ at the top of the fixed collar, and is discharged through the pipe $d^2$.

It will be seen on reference to Fig. 9 that the inner portion of the collar fits closely in the bottom of the groove in the ring $u^1$; but this groove is enlarged outward for the reception of strands of packing material $e^2$, which is held in place by a series of segmental followers, $f^2$, secured by bent bolts $g^2$. The segments, Fig. 8, thus form two rings, $h^2$, on each side of the collar.

In order to prevent the packing from penetrating between the joints of the segments, Fig. 8, I adapt to the ends of the segments thin metal lap-joints $i^2$, and I roughen or form teeth on the faces of the segments and grooves in contact with the packing, so as to overcome the tendency of the frictional contact of the stationary collar to displace the packing.

The smoke-box $n^2$, which forms the communication between the puddling-chamber and the chimney, and which consists of a double jacket lined with brick and oxide of iron, is secured to a horizontal pivot adapted to bearings $w^4$, and carrying a pinion, $u^2$, Figs. 2 and 6, so that the said box can be turned away from contact with the drum when it is desired to introduce the charge into the puddling-chamber. Into said pinion $u^2$ gears a rack, $v^2$, attached to or forming part of the piston-rod $y^2$ of the hydraulic cylinder $x^2$, so that by depressing the piston of this cylinder the smoke-box may be tilted or swung up, so as to expose the opening in the end of the puddling-chamber, as indicated by dotted lines in Fig. 6.

On the side of the smoke-box adjacent to the drum is arranged an annular water-chamber, $j^3$, provided with a steel friction-ring, $k^3$, this chamber $j^3$ being in communication through an elbow, $e^3$, Fig. 1, with the water-space of the jacket.

The cold water circulates through the smoke-box as follows: It enters at the elbow $c^3$, Fig. 2, passes through the pipe $d^3$ into the annular chamber $j^3$, passes thence through the elbow $e^3$ and pipe $f^3$, Fig. 1, to the bottom of the jacket of the smoke-box. Then, after circulating through this jacket, it passes out through the pipe $g^3$ $h^3$, Fig. 2, to the elbow $c^3$, and out at $i^3$.

The whole smoke-box can be adjusted laterally with the pivot in its bearings $u^4$, carrying the pinion, by means of the screw $t^2$, Figs. 1 and 2, so as to bring the inner face of the box into more or less close contact with the end of the puddling-drum. In the back of the box are arranged a work-door, $a^3$, and peep-hole $b^3$.

The rotary drum receives its motion from a two-cylinder engine, $l^3$, through the medium of the gears $o^3$ and $p^3$, or $m^3$ and $n^3$ and pinion $r^3$, gearing into the toothed ring on the periphery of the drum.

The gear-wheels $o^3$ $p^3$ and the wheels $m^3$ $n^3$ are of different relative sizes, so that by throwing the clutch $q^3$ on the shaft carrying the pinion $r^3$ into gear with one or other of the wheels $p^3$ $n^3$, the drum may be rotated faster or slower, as occasion may require, in proportion to the speed of the engine.

I do not desire to claim, broadly, the partition in the drum, nor the rotary drum with double water-jacket; but

I claim as my invention—

1. In a furnace, the combination of the roof and outer casing, forming an intermediate air-chamber, with air-conduits $j$ and $k$, one above the bridge and the other at the front of the combustion-chamber, as set forth.

2. The within-described furnace, having a full opening or openings or stir-openings, communicating through passages in the wall of the furnace with the air-blast, whereby the products of combustion are prevented from escaping at these openings, as set forth.

3. The combination of the hopper $z$ of the fuel-opening, having a door, $a^2$, with a valved conduit communicating with air-passages in the wall of the furnace, whereby the escape of the products of combustion at the joints is prevented, all substantially as described.

4. The stationary fire-place having a tubular outlet and hollow ring $h$, provided with a detachable friction-ring, in combination with the rotary drum.

5. The combination of the cylinders forming the double jacket of the puddling-drum with the annular bent piece $j^2$, as and for the purpose specified.

6. The combination of the end pieces $j^2$ of the rotating drum with detachable friction-rings.

7. The combination of the rotating drum having a water-jacket and grooved ring, $u^1$, with the stationary collar $x^1$, provided with tubular projections $a^2$ and $c^2$, as described.

8. The combination of the drum and grooved ring $u^1$ with the stationary collar $x^1$ and series of followers $f^2$, and intermediate packing.

9. The combination of the puddling-chamber with a smoke-box pivoted in horizontal bearings, whereby said box may be tilted upward, as described.

10. The combination of the puddling-chamber and the smoke-box mounted on a horizontal pivot with hydraulic mechanism, substantially as described, for swinging said box upward on its pivot.

In testimony whereof I have signed my name to this specification in the presence of two subscribing witnesses.

H. E. A. SCHNEIDER.

Witnesses:
ALFRED COINY,
ROBT. M. HOOPER.